(12) United States Patent
Hansen

(10) Patent No.: US 6,531,170 B2
(45) Date of Patent: Mar. 11, 2003

(54) METHOD OF AND APPARATUS FOR APPLYING AND DISTRIBUTING A CHARGE OF A PARTICULATE MATERIAL ONTO A TOP SURFACE OF A SUBSTRATE, SUCH AS A PIZZA BATTER

(75) Inventor: Henning Ingemann Hansen, Odense (DK)

(73) Assignee: Cabinplant International A/S, Harby (DK)

( * ) Notice: Subject to any disclaimer, the term of this patent is extended or adjusted under 35 U.S.C. 154(b) by 16 days.

(21) Appl. No.: 09/826,375

(22) Filed: Apr. 3, 2001

(65) Prior Publication Data

US 2002/0022071 A1 Feb. 21, 2002

(30) Foreign Application Priority Data

Apr. 4, 2000 (EP) ............................................ 00610032

(51) Int. Cl.[7] .............................. A23L 1/00; A21C 9/04
(52) U.S. Cl. .................... 426/289; 99/450.1; 99/494; 118/22; 118/57; 426/292
(58) Field of Search ................................ 426/289, 292, 426/273, 96; 99/450.1, 494; 118/14, 22, 57

(56) References Cited

U.S. PATENT DOCUMENTS

| | | | | |
|---|---|---|---|---|
| 3,012,697 A | | 12/1961 | Rouse | |
| 3,759,218 A | * | 9/1973 | Korstvedt | 118/22 |
| 4,152,976 A | | 5/1979 | Kawasaki et al. | |
| 4,264,634 A | * | 4/1981 | Hochandel et al. | 426/289 |
| 5,078,090 A | | 1/1992 | Richman | |
| 5,678,476 A | * | 10/1997 | Sanders | 99/450.1 |

* cited by examiner

Primary Examiner—George C. Yeung
(74) Attorney, Agent, or Firm—Klein, O'Neill & Singh, LLB

(57) ABSTRACT

A method of applying and distributing a charge of a particulate edible material onto a top surface of a substrate made of an edible dough product includes the steps of: (1) providing a charge of particulate edible material from an overhead hopper; (2) delivering the charge onto a movable vibrational surface having an area exceeding the area of the substrate, the surface being positioned above and in registration with the substrate; (3) keeping the charge on the vibrational surface within a specific area corresponding to the area of the substrate by the use of an encircling guide defining the specific area and having a lower end with a flexible skirt for contacting and sealing against the vibrational surface; (4) vibrating the vibrational surface for causing the charge received on the vibrational surface and kept within the specific area to be evenly and randomly distributed within the specific area; and (5) transferring the charge from the vibrational surface onto the substrate by moving the vibrational surface away from the position above and in registration with the substrate while vibrating the vibrational surface for allowing the charge evenly and randomly distributed within the specific area of the vibrational surface to drop onto the substrate. An apparatus for carrying out this method is also provided.

11 Claims, 4 Drawing Sheets

Figure 1:
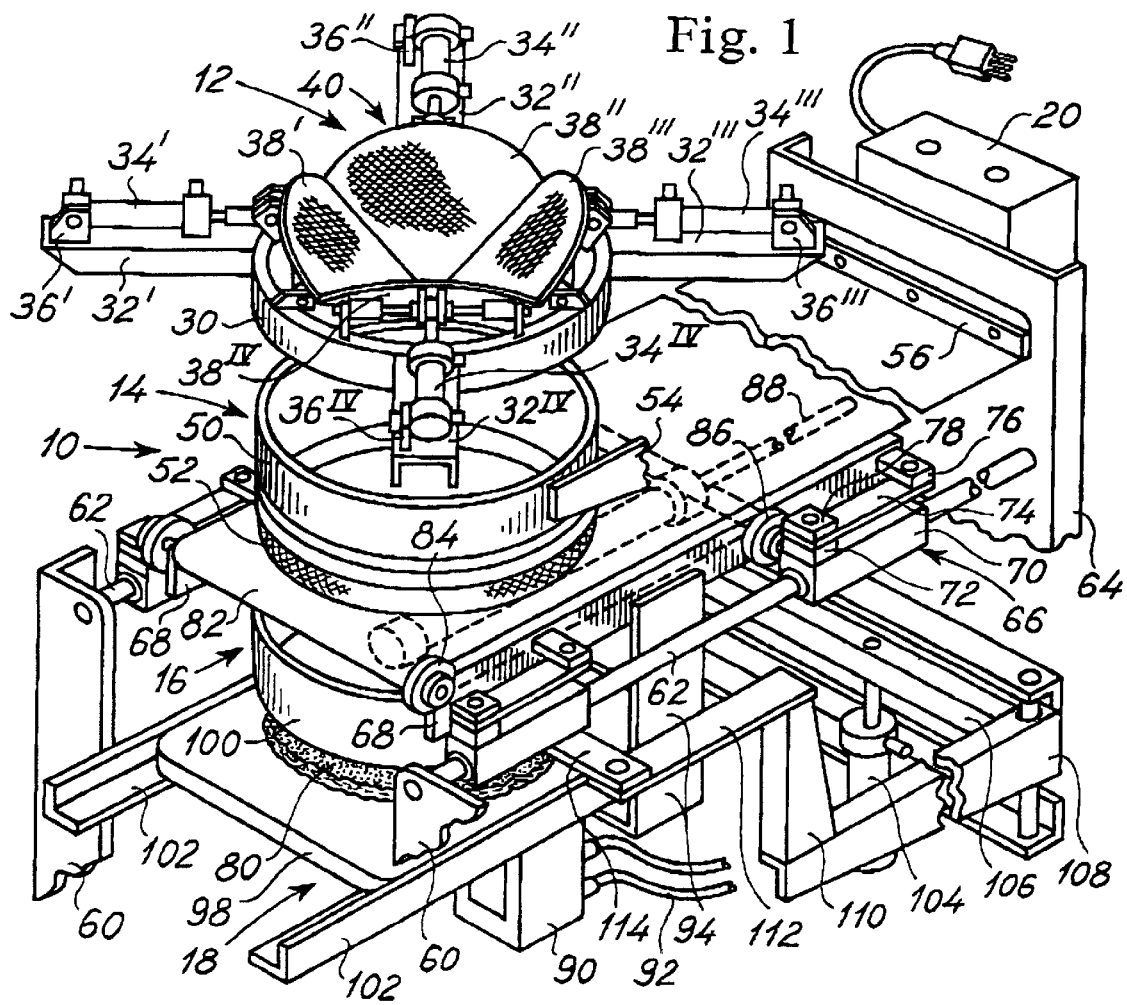

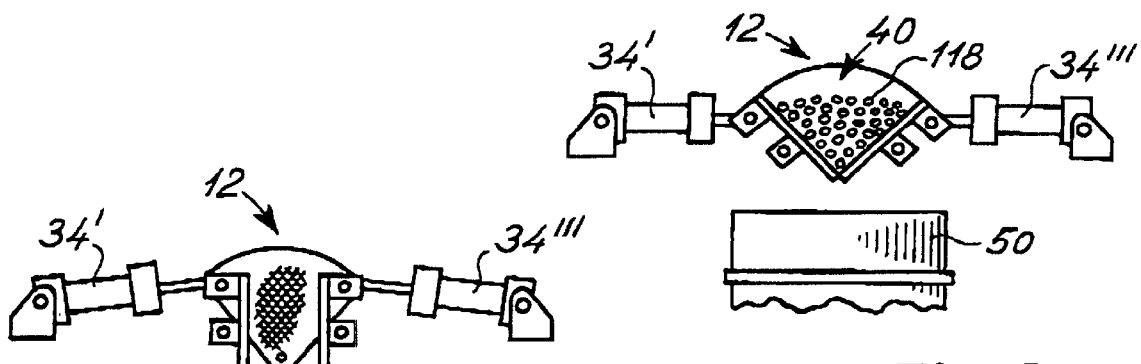
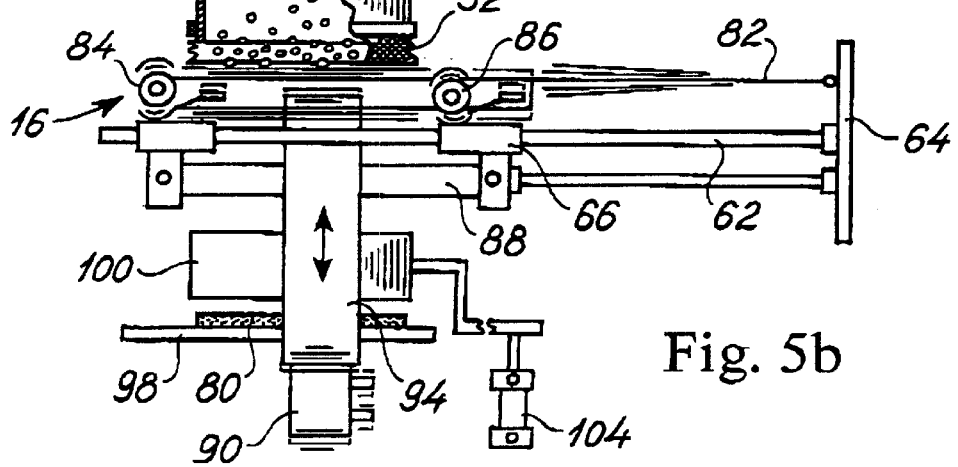
Fig. 5a
Fig. 5b
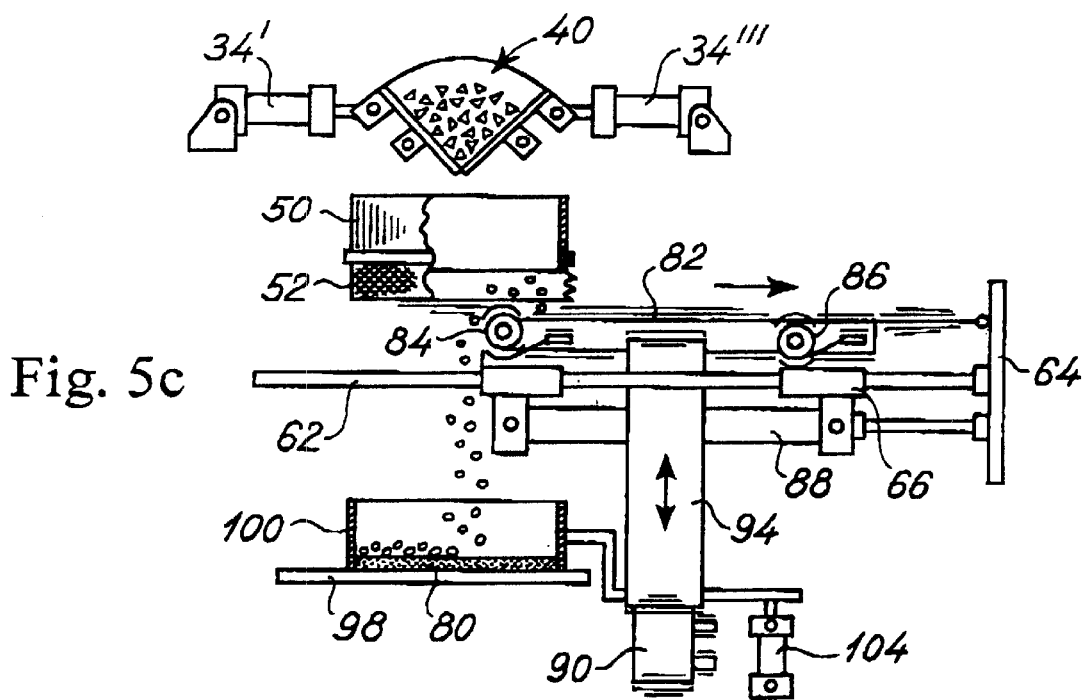
Fig. 5c

METHOD OF AND APPARATUS FOR APPLYING AND DISTRIBUTING A CHARGE OF A PARTICULATE MATERIAL ONTO A TOP SURFACE OF A SUBSTRATE, SUCH AS A PIZZA BATTER

The present invention relates to a method of applying and distributing a charge of a particulate material onto a top surface of a substrate, such as a pizza batter. The present invention further relates to an apparatus for the application and distribution of the charge of the particular material onto the top surface of the substrate, such as a pizza batter.

Within the technique, several technical solutions for the application and distribution of a charge such as a charge of a specific foodstuff constituent or a mixture of different foodstuff constituents are known, in particular in relation to the production of pizzas as the particulate material is to be applied onto a pizza batter. Examples of the prior art techniques of applying and distributing a charge of a particulate onto a pizza batter are described in EP 0 787 431 and EP 0 947 137. According to the technique known from EP 0 787 431, a swiftly operated iris opener is stated to allow for the even distribution of the particulate material onto the pizza batter provided the material is initially evenly distributed on the iris opener as the material is stated to be evenly distributed onto the pizza batter provided the iris opener is swiftly shifted from its closed state to its open state. The swift opening of the iris opener calls for an extreme mechanical impact to the particulate material and also an excessive force impact to the iris opener which iris opener is also subjected to being jammed or otherwise blocked provided the particulate material be jammed between the individual plate elements of the iris opener. According to the technique known from EPO 947 137, the particulate material is stated to be evenly distributed on the pizza batter by the utilization of baffle and guide plates which are stated to provide an adequate and sufficient distribution of the material as the material is simply allowed to drop out from an overhead container and into contact with a baffle and guiding plate. It has, however, turned out that the even distribution of the material onto the pizza batter cannot be accomplished through the utilization of simple baffle and guide plates as the material inevitably is collected at specific locations below the baffle or guide plates rather than being evenly distributed.

It is an object of the present invention to provide a simple and reliable technique for the application and distribution of a particulate material onto an underlying substrate such as the distribution of particulate foodstuff onto a pizza batter which technique on the one hand ensures an even distribution of the particulate material onto the underlying substrate and on the other hand exposes the particulate material to a minimum of physical impact as compared to the prior art iris opening technique and the technique of allowing the material to fall a substantial distance before contacting a guiding plate such as a baffle or guide plate.

It is a further feature of the present invention that the technique of applying and evenly distributing a particulate material onto an underlying substrate also causes a minimum wear to the components of the apparatus and further provides a delicate and minimum force impact to the particulate material to be applied and evenly distributed onto the underlying substrate.

The above object and the above feature together with numerous other objects, features and advantages which will be evident from the below detailed description of the presently preferred embodiments of the technique according to the present invention are in accordance with the teachings of the present invention obtained by a method of applying and distributing a charge of a particulate material onto a top surface of a substrate, such as a pizza batter, comprising:

providing the charge, delivering the charge onto a movable vibrational surface having an area exceeding the area of the substrate, the surface being positioned above and in registration with the substrate, keeping the charge on the vibrational surface within a specific area corresponding to the area of the substrate by means of an encircling guide defining the specific area and having at its lower end a flexible skirt for contacting and sealing against the vibrational surface, vibrating the vibrational surface for causing the charge received on the vibrational surface and kept within the specific area to be evenly and randomly distributed within the area, and transferring the charge from the vibrational surface onto the substrate by moving the vibrational surface away from the position above and in registration with the substrate while vibrating the vibrational surface for allowing the charge evenly and randomly distributed within the specific area of the vibrational surface to drop onto the substrate.

According to the teachings of the present invention, the application of the particulate material onto the underlying substrate is established in a combined vibrational and vibrational surface moving operation. As the material is vibrated by means of the vibrational surface and as the vibrational surface is moved away from its position above and in registration with the underlying substrate, the particulate material is merely exposed to the mechanical impact by the vibration of the material rather than the falling through an assembly including baffle and guide plates or alternatively the swiftly opening of an iris opener. Still according to the teachings of the present invention, the utilization of the vibrational surface and the movement of the vibrational surface away from the position above and in registration with the substrate and keeping the charge of the particulate material within the encircling guide in combination provides an adequate and even distribution of the charge of the particulate material onto the top surface of the underlying substrate and at the same time exposes the particulate material to a minimum physical impact.

Although the charge of particulate material to be distributed onto the underlying substrate in accordance with the teachings of the present invention may be provided in any adequate manner by means of any mechanical means such as a conveyer belt, the charge is in accordance with the presently preferred embodiment of the method according to the present invention preferably provided from an overhead charge distributor such as an overhead openable hopper for ensuring that the charge is readily introduced into the specific area defined by the encircling guide and through the vibration of the vibrational surface caused to be evenly distributed on said specific area.

The vibrational surface may in accordance with the teachings of the present invention be constituted by any solid or pliable means such as a moveable plate or alternatively and preferably a flexible and foldable foil or web commonly known within the technical field as a shuttle conveyor belt. Through the utilization of a shuttle conveyor belt constituting the vibrational surface, a simple and reliable and further wear-resistant means is provided fulfilling the purpose of the vibrational surface of on the one hand providing the even distribution of the particulate material onto the underlying substrate and on the other hand exposing the particulate material to a minimum mechanical impact or influence.

The technique of applying and distributing a charge of a particulate material onto the top surface of a substrate according to the method of the present invention may be established by moving the vibrational surface and the cooperating encircling guide into a position above the pizza batter, however, according to the presently preferred embodiment of the method according to the present invention, the substrate is preferably positioned in registration with the encircling guide as the method may advantageously further comprise the step of arranging the substrate in the position below and in registration with an encircling guide before starting vibrating the vibrational surface and moving the vibrational surface away from the abovementioned position above and in registration with the substrate for establishing the transfer of the charge from the vibrational surface onto the substrate.

In order to guarantee that the particulate material which is allowed to drop onto the substrate from the vibrational surface as the vibrational surface is moved away from its position above and in registration with the substrate, the method according to the present invention preferably further comprises the step of positioning a further encircling guide circumpherentially encircling the substrate while transferring the charge from the vibrational surface onto the substrate and raising the further encircling guide for allowing the substrate to be removed after the transfer of the charge to the substrate.

The present invention further relates to as stated above an apparatus for applying and distributing a charge of a particulate material onto the top surface of a substrate such as a pizza batter. The above object, the above features together with numerous other objects, features and advantages which will be evident from the below detailed description of the presently preferred embodiments of the technique according to the present invention are in accordance with the teachings of the present invention obtained by an apparatus for applying and distributing a charge of a particulate material onto a top surface of a substrate, such as a pizza batter, comprising:

a delivery means for delivering such charge a movable vibrational surface having an area exceeding the area of the substrate, the surface being positioned above and in registration with the substrate, and further being positioned below the delivery means for receiving the charge from the delivery means, an encircling guide means for keeping the charge on the vibrational surface within a specific area corresponding to the area of the substrate, the encircling guide defining such specific area and having at its lower end a flexible skirt for contacting and sealing against the vibrational surface, a vibration generating means for vibrating the vibrational surface for causing the charge received on the vibrational surface and kept within the specific area defined by the encircling guide to be evenly and randomly distributed within the area, and a motion generating means for moving the vibrational surface away from the position above and in registration with the substrate while vibrating the vibrational surface for allowing the charge evenly and randomly distributed within the specific area of the vibrational surface to drop onto the substrate thereby transferring the charge from the vibrational surface onto such substrate.

The apparatus according to the present invention may further advantageously be implemented in accordance with above described advantageous and preferred embodiments of the method according to the present invention. Still further, the vibrational surface of the apparatus according to the present invention may preferably be vibrated at a frequency of frequency of 1–25 Hz such as 2–20 Hz, e.g. 3–15 Hz, such as 6–12 Hz further preferably approximately 10 Hz.

According to the teachings of the present invention, the amplitude of the vibration to which the particulate material be exposed while vibrating the vibrational surface may be adapted or adjusted to the material in question for preventing the particulate material to be exposed to excessive physical impact, provided the particulate material be a delicate particulate material such as certain groceries. In the presently preferred embodiment of the apparatus according to the present invention, the amplitude (RMS: Root Mean Square) of the vibration of the vibrational surface is of the order of 1–20 mm, such as 3–12 mm, preferably approximately 10–12 mm, the vibrational impact being of a sinusoidal configuration or alternatively any other configuration.

Figure 2:
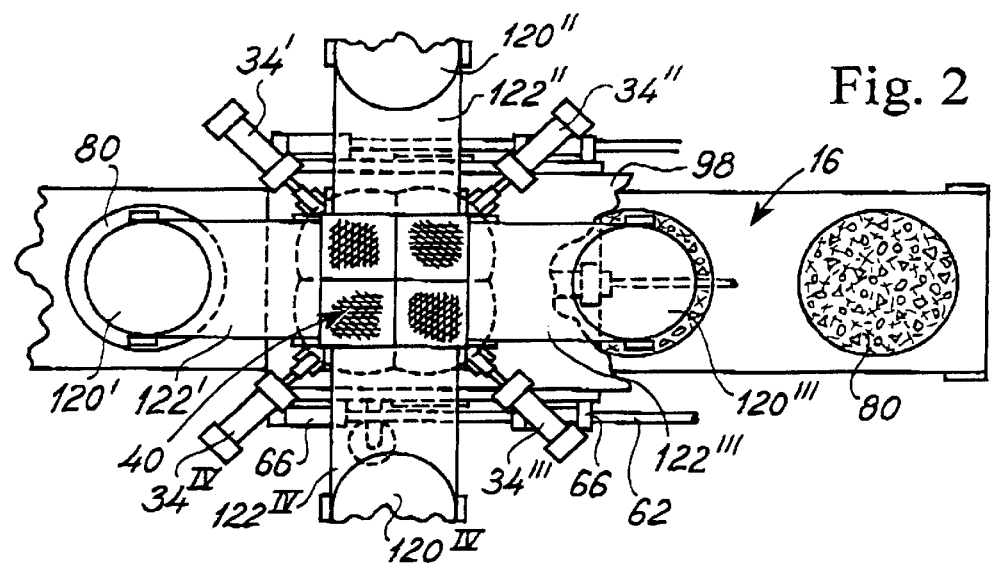
Figure 3:
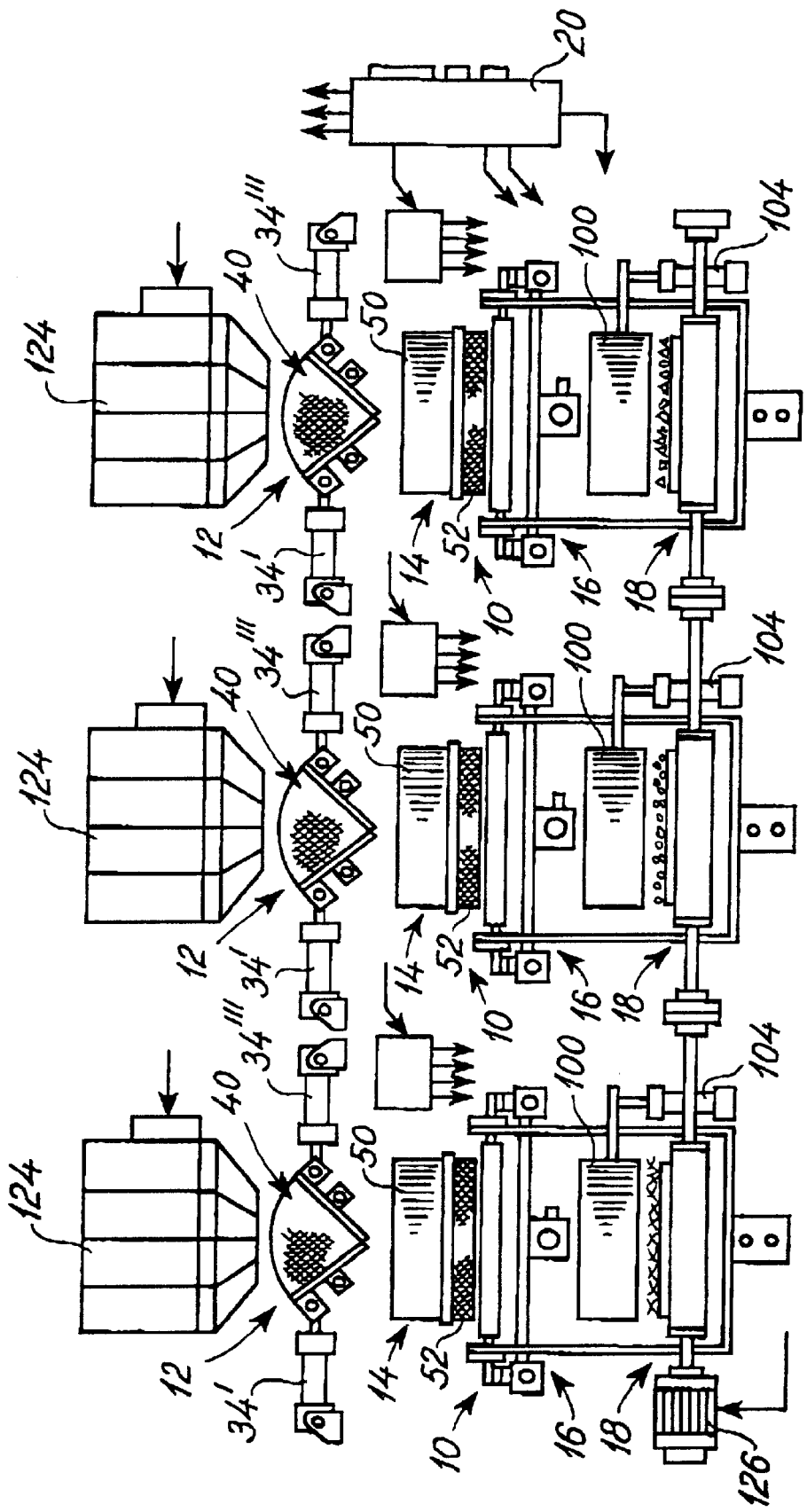
Figure 4:
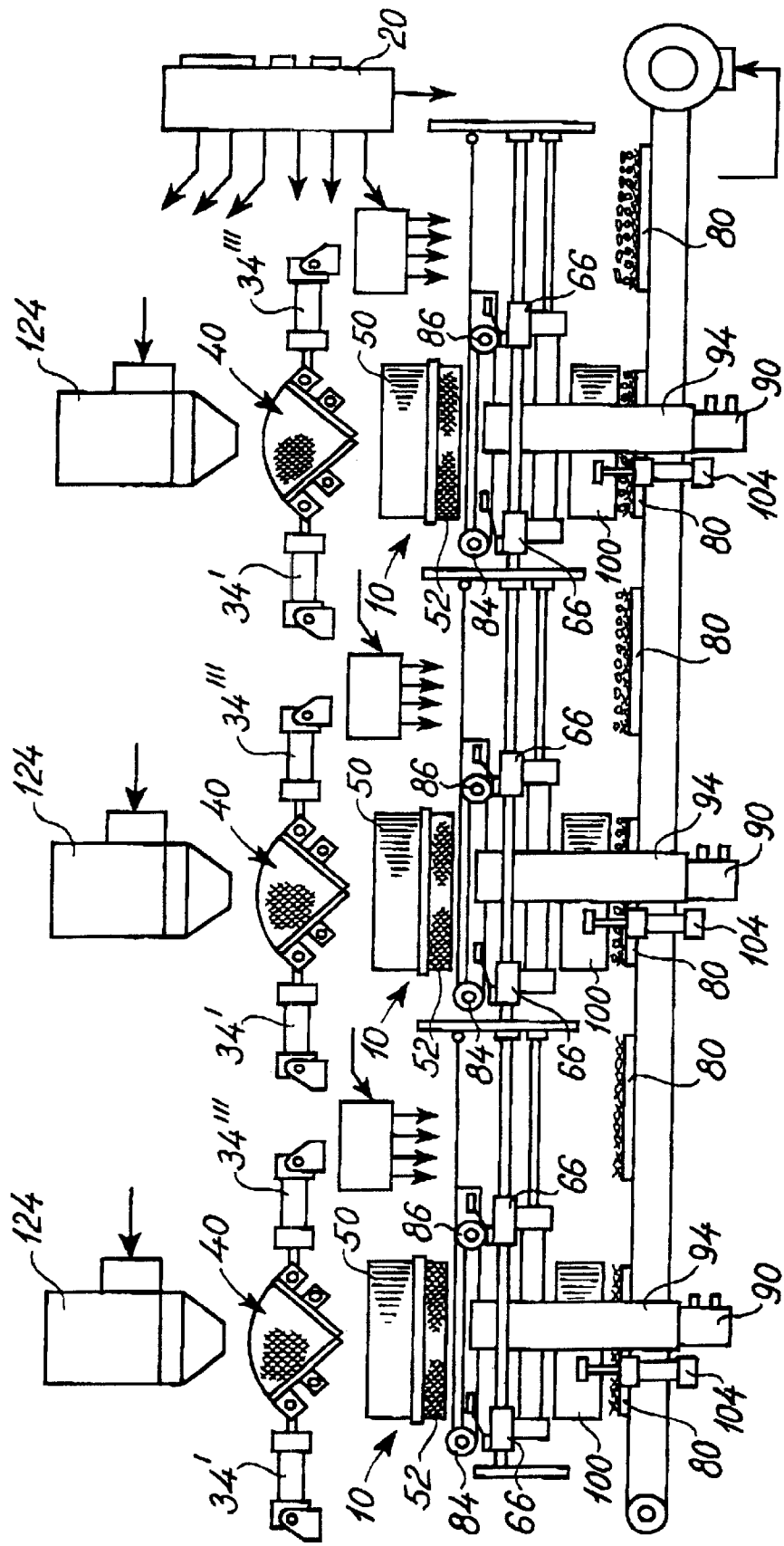

The present invention is now to be further described with reference to the drawings in which FIG. 1 is a schematic, perspective and partly cut-away view of a first and presently preferred embodiment of an apparatus according to the present invention for the application and even distribution of a particulate material such as chopped foodstuff ingredients onto a surface of a product such as a pizza batter, FIG. 2 is a schematic and partly cut-away top view of the first embodiment of the apparatus according to the present invention also shown in FIG. 1, FIG. 3 is a schematic and elevational view of a plant according to the present invention including three systems operated in parallel and each including an apparatus according to the present invention as implemented by the first and presently preferred embodiment of the apparatus according to the present invention illustrated in FIGS. 1 and 2, FIG. 4 is a schematic and elevational view similar to the view of FIG. 3 of a further plant according to the present invention including three apparatuses according to the present invention operated in a sequence for the sequential application of specific ingredients onto a pizza batter, and FIG. 5 is a schematic and elevational view of the presently preferred first embodiment of the apparatus according to the present invention also shown in FIGS. 1–4 and illustrating the function and operation of the apparatus.

In the below description, a technique of applying ingredients is described such as specific foodstuff constituents e.g. olives, chopped peppers, chopped tomatoes, chopped onion, chopped artichokes, chopped mushrooms, chopped ham, chopped beef, chopped pork, chopped mutton, chopped chicken, chopped turkey in fresh, boiled, roast or smoked form, chopped or cut-up fish, including fresh, roast, boiled or smoked fish parts of for example mackerel, tuna, herring, flatfish, codfish, salmon, sea trout etc. and combinations of such foodstuff ingredients onto a piece of dough in particular a batter or a paste, more particular onto a pizza batter before the baking of the batter or dough piece or alternatively onto a piece of bread or similar substrate. In particular, the below description refers to the application of constituents being foodstuffs constituents onto a pizza batter, still, it is contemplated that the technique and the apparatus and methods implementing the present invention may advantageously be used in similar applications for the application and evenly distribution of constituents onto a substrate, preferably within the field of food processing.

In FIG. 1, a first and presently preferred embodiment of the apparatus for the application and evenly distribution of foodstuff ingredients onto a pizza batter is shown designated the reference numeral 10 in its entirety. The apparatus 10 is generally composed of four individual components, firstly an openable top hopper 12, secondly a circular material guide 14, thirdly a vibrational displacement or shuttle table 16, and fourthly a displaceable plate or conveyer 18. The apparatus is, as will be described in greater details below, controlled by a central controller 20 monitoring the operation of the apparatus by means of sensors and further sequentially addressing and operating the above four components of the apparatus.

The four components mentioned above are now to be further described in greater details, one at a time.

The openable top hopper 12 includes a central circular cylindrical supporting component 30 defining a central circular opening defining a diameter corresponding to the overall diameter of the product or substrate such as a pizza batter onto which material is to be applied or evenly distribute. In an orthogonal system, four brackets 32', 32", 32'" and $32^{iv}$ extend outwardly from the supporting component 30 serving the purpose of supporting actuators 34', 34", 34'" and $34^{iv}$, respectively. The actuators may be constituted by electric, pneumatic or hydraulic actuators preferably constituted by swiftly operated pneumatic actuators which are supported by their respective brackets at the outer end of the actuators which outer ends are firmly connected to the supporting bracket through a vertically extending plate designated the reference numerals 36'–$36^{iv}$, respectively. The movable ends of the actuator 34'–$34^{iv}$ are connected to a respective triangular plate element 38'–$38^{iv}$, respectively.

The triangular plate elements 38'–$38^{iv}$ are positioned in a sloping orientation defining an angle of approximately 45° relative to horizontal and together define a receptor space 40. The openable top hopper 10 is used for receiving a charge of the material to be applied onto the above mentioned pizza batter as the material is introduced into the receptor space 40 defined between the four sloping triangular plate elements 38'–$38^{iv}$. The material received within the receptor space 40 is discharged from the openable top hopper 12 as the four triangularly shaped plate elements 38'–$38^{iv}$ are moved apart as the actuators 34'–$34^{iv}$ are operated simultaneously causing the respective triangular plate element 38'–$38^{iv}$ to be displaced radially outwardly along a line defined by the respective bracket 32'–$32^{iv}$.

The circular material guide 14 comprises a ring shaped element 50 which is positioned below and in coaxial registration or alignment with the circular cylindrical supporting component 30 of the openable top hopper 12. The ring shaped element 50 is further positioned a short distance below the openable top hopper 12 ensuring that the material discharged from the openable top hopper 12 as the triangular plate elements 38'–$38^{iv}$ are separated and swiftly moved radially outwardly for discharging the material received within the receptor space 40 of the openable top hopper 12 is safely received within the ring shaped element 50 without any material being wasted by the material being expelled outside the ring shaped element 50. At the lower part of the ring shaped element 50, a flexible skirt 52 is provided which flexible skirt provides a firm closure in relation to the vibrational displacement table 16 positioned below the circular material guide 14. In FIG. 1, the reference numeral 54 designates a supporting plate element which serves the purpose of firmly and rigidly connecting the ring shaped element 50 of the circular material guide 14 relative to the frame of the apparatus 10 and similar supporting plate element, brackets etc. serve the purpose of rigidly fixating the openable top hopper 12 relative to the frame of the apparatus which supporting elements or brackets are not shown in the drawings for the sake of clarity.

The central part of the apparatus 10 according to the present invention is constituted by the vibrational displacement or shuttle table 16. The table 16 serves the dual purpose of vibrating the table and displacing the table from its position below the skirt 52 of the ring shaped element 50 for allowing the material lying on the table to drop down onto a pizza batter 80 lying on the plate or conveyer 18 positioned below the vibrational displacement table. The displacement or shuttle table 16 is mounted on two front pillars 60 from which two horizontal bars 62 extend to and are fixated to a vertical bracket or plate 64. The bars 62 extend in parallel with the lower surface of the ring-shaped element 50 and further in parallel with the orientation or motion of the underlying displaceable plate or conveyor 18.

On each of the bars 62, two sliding assemblies are fixated, which sliding assemblies serve the purpose of fixating a respective side bar 68 relative to the frame of the apparatus. The side bars 68 each support a pair of roller bearings 84, 86. The roller bearings 84 further support a transverse bar whereas the roller bearings 86 support a take-up element to be described in greater detail below. The transverse bar and the take-up element are linked together in a solid structure.

Each of the assemblies 66 comprises a body 70 having a through-going bore in which the bar 62 is slidingly received and defines a plane top surface on which a further square body 72 is positioned. From the square body 72, an elongated flexible plate 74 extends in parallel with and above the body 70 and is further fixated to a rectangular plate 76 which is fixated to one end of one of the side bars 68.

The elongated plate 74 and the square body 72 are fixated to the body 70 by means of a screw extending through a further square body 78 at the one end of the elongated plate 74, and the rectangular plate 76 is similarly fixated to the elongated plate 74 by means of a screw.

The elongated plates 74 which are preferably constituted by rubber elements or alternatively flexible plastics elements serve the purpose of providing a flexible suspension of the side bars 68 relative to the supporting frame of the apparatus 10 for allowing the side bars 68 along with the components supported by the side bars to be vibrated relative to the supporting frame.

The displacement or shuttle table 16 comprises a flexible and pliable web 82 which is preferably a flexible and foldable yet non-extendable web such as a woven polymer web or alternatively a continuous polymer foil. The web or foil 82 is at its one end fixated to the bracket 64 by means of a transversal bar 84 and is wound round the above-mentioned bar journalled at opposite ends in the above described roller bearings 84. The opposite end of the web or foil 82 is received by the above-mentioned take-up element journalled at opposite ends in the roller bearings 86. The take-up element is preferably a spring-biased element which serves the purpose of maintaining the web or foil 82 in its extended and stretched state.

The displacement or shuttle table 16 which also constitutes the vibrating table of the apparatus 10 is exposed to a vibrational force impact which is generated by an ultra-low frequency generator 90 which is supplied with electric power or alternatively pneumatic or hydraulic power through cables or wires 92 and is connected to a yoke element 94 which is fixated at its upper free ends to the side bars 68. As the vibration generating generator 90 generates a vibrational motion of the yoke 94 e.g. of a frequency of 0.5–5 Hz, preferably of the order of 0.5–3 Hz such as approximately I Hz, the side bars 68 are also oscillated or vibrated at the same frequency causing the material collected on the top of the web or foil 82 of the vibrator displacement or shuttle table 60 to vibrate within the periphery of the ring-shaped element 50 and is prevented from being expelled outside the ring-shaped element 50 due to the flexible skirt 52.

The vibrational displacement or shuttle table 16 is further exposed to a displacement force generated by a hydraulic or pneumatic cylinder 88 which causes the assemblies 66 to be moved along the side bars 62 and in doing so causes the flexible web or foil 82 to be collected on the take-up element described above and journalled at opposite ends in the roller bearing 86. The piston 86 is at its one end rigidly connected to a fixed element of the apparatus such as the bracket 64 and is at is opposite end connected to the above described structure journalled in the roller bearings 70 and 86. For allowing the structure to be moved from the left-hand position shown in FIG. 1 in which the web or foil 82 covers the lower side of the skirt 52 to a right-hand side in which the lower side of the skirt 52 is exposed allowing the material collected on and being vibrated by means of the vibrational displacement or shuttle table 16 to fall down onto the pizza batter 80 which is positioned on a plate 98 below a further guiding element constituted by a ring-shaped element 100 serving the same purpose as the above-described ring-shaped element 50 positioned below the openable top hopper 12.

The ring-shaped element 100 is in FIG. 1 shown in a raised position in which the plate 98 may be shifted away from the position shown in FIG. 1 below and in registration with the ring-shaped elements 30, 50 and 100. As the vibrational displacement and shuttle table 16 is activated for causing the vibration of the table and at the same time moving the shuttle conveyor belt from the left-hand position shown in FIG. 1 to the above described right-hand position, the ring-shaped element 100 is lowered into contact with the upper surface of the plate 98, thereby establishing a hermetical seal along the outer periphery of the pizza batter 80 for preventing any material dropping onto the pizza batter from being spread over the plate 98 beyond the area defined within the rein-shaped element 100. For providing the raising and lowering of the ring-shaped element 100, a hydraulic or pneumatic cylinder 104 is further provided which hydraulic or pneumatic cylinder 104 has its one end rigidly connected to the frame of the apparatus and its other end connected to a transversal bar 106. The transversal bar is at its one end connected to an L-shaped side bracket 108 on which a further L-shaped bracket 110 is mounted, which further L-shaped bracket 110 is connected through two plate elements 112 and 114 to the ring-shaped element 100. As the piston of the hydraulic or pneumatic cylinder 104 is raised, the transversal bar 106 is also raised causing the raising of the ring-shaped element 100 by the provision of the linkage between the transversal bar 106 and the ring-shaped element 100 the brackets 108 and 110 and the plate elements 112 and 114. The ring-shaped element 100 is lowered into contact with the plate 98 by deactivating the hydraulic or pneumatic cylinder 104 causing the lowering of the transversal bar 106 and thereby also lowering of the ring-shaped body 100.

The plate 98 is moved along two L-shaped tracks 102 and may be resting below the ring-shaped element 50 as the web or foil 82 is moved from the above-described left-hand positioned shown in FIG. 1 to the above-described right-hand positioned not shown in FIG. 1 in which the lower side of the skirt 52 is exposed or alternatively be moved along with the web or foil 82 at the same speed, or alternative a lower or a higher speed depending on the initial position of the pizza batter 80 as compared to the position of the web or foil 82. Preferably, the plate 98 is kept stationary while the web or foil 82 is wound onto the take-up element as the above described structure is moved from the left-hand position shown in FIG. 1 to the right-hand position exposing the lower side of the skirt 52.

The take-up element may apart from being constituted by a mechanically self-operating element such as a spring-loaded element well known per se from e.g. roller blind be constituted by a powered element such as an element powered by a motor which is controlled by a central computer 20 and operated by the central computer 20 for maintaining a constant pull in the web or foil 82 independent of the position of the web or foil and in doing so maintaining the web or foil 82 in a permanently stretched state.

In FIG. 2, the apparatus 10 for the application and evenly distribution of foodstuff ingredients is shown from above. In FIG. 2, four additional apparatuses are illustrated serving the purpose of a supplying materials from four separate containers 120', 120", 120''' and 120$^{iv}$ into the receptor space 40 of the openable top hopper 12 as the materials contained within the containers 120'–120$^{iv}$ is delivered from bottom apertures of the containers onto respective conveyor belts 122', 122", 122''' and 122$^{iv}$. In the apparatus shown in FIG. 2, the constituents to be applied to the individual pizza batters 80 are delivered onto the individual pizza batter in a single charge including all four constituents. As will be evident, the apparatus shown in FIG. 2 including four delivery apparatuses or four delivery stations may alternatively be operated for the supply of only one type of foodstuff to the openable top hopper 12 or alternatively may two or three containers along with their respective conveyor belts be operated for the delivery of two or alternatively three types of foodstuffs. In a modified embodiment, a further plurality of containers may be positioned along with their respective conveyor belts overhead the containers and conveyor belts shown in FIG. 2 or alternatively may the apparatus be modified by the omission of one, two or alternatively three of the containers along with the respectively container belts shown in FIG. 2.

The apparatus 10 described above may in accordance with alternative combinations be used in a parallel system such as a three run system 130 shown in FIG. 3 in which three apparatuses 10 are operated in parallel as the conveyor belts belonging to the respective apparatus 10 is driven by a common motor 126 which serves the purpose as is schematically illustrated in FIG. 3 of operating and driving three parallel conveyor belts. In FIG. 3, a four compartment delivery apparatus 124 is further shown for the delivery of four constituents to each of the three apparatuses 10.

Alternatively, the apparatus 10 according to the present invention may be used for delivering a specific constituent onto a pizza batter 80 as is illustrated in FIG. 4 in which a three-station system is shown. The system includes a single conveyor belt driven by the motor 126 and is split into three sections for the supply of a respective constituent or type or foodstuff onto the pizza batters moved by means of the conveyor belt driven by the motor 126. In the first station, a first constituent is supplied to the pizza batter 80 as is illustrated in the first and second pizza batter shown in the left-hand part of FIG. 4, and in the second station a further constituent is applied on top of the first constituent as is illustrated in the central part of FIG. 4 in which the third and fourth pizza batters are showed, and finally, in the third right-hand station shown in FIG. 4, a third constituent is applied on top of the second and third constituents as is illustrated on the fifth and sixth pizza batters shown in the right-hand part of FIG. 4.

In FIGS. 5a, 5b and 5c, three details of the operation of the apparatus 10 is shown as in FIG. 4a, the foodstuff to be applied to the pizza batter is received within the top hopper 12 which foodstuff is designated the reference numeral 118.

In FIG. 5b, the openable top hopper 12 is opened for the delivery of the foodstuff 118 into the ring-shaped element 50 as the vibratable displacement or shuttle table 16 is further vibrated as is illustrated also in FIG. 5b. Finally, in FIG. 5c, a new charge of material 118 is introduced into the openable top hopper 12, and at the same time, the displacement or shuttle table 16 is moved from the initial left-hand position shown in FIG. 5b to the right-hand position shown in FIG. 5c, as the material previously introduced into the ring-shaped element 50 shown in FIG. 5b is allowed to drop into the further ring-shaped element 100 as the vibrating displacement or shuttle table is at the same time vibrated while the table is shifted from left to right. Further in FIG. 5b, the ring-shaped element 100 is raised whereas in FIG. 5c, the ring-shaped element 100 is lowered into contact with the plate 98 circumpherentially encircling the pizza batter 80.

In the above description, a presently preferred embodiment of the apparatus for the delivery of a charge of material onto a piece of material such as a pizza batter is described with reference to specific elements. However, within the scope of the present invention, numerous modifications are readily perceivable by a person having ordinary skill in the art, and these modifications are all to be construed part of the present invention as defined in the depending claims.

What is claimed is:

1. A method of applying and distributing a charge of a particulate edible material onto a top surface of a substrate made of an edible dough product, comprising:

providing said charge;

delivering said charge onto a movable vibrational surface having an area exceeding the area of said substrate, said surface being positioned above and in registration with said substrate;

keeping said charge on said vibrational surface within a specific area corresponding to the area of said substrate by means of an encircling guide defining said specific area and having a lower end with a flexible skirt for contacting and sealing against said vibrational surface;

vibrating said vibrational surface for causing said charge received on said vibrational surface and kept within said specific area to be evenly and randomly distributed within said specific area; and transferring said charge from said vibrational surface onto said substrate by moving said vibrational surface away from said position above and in registration with said substrate while vibrating said vibrational surface for allowing said charge evenly and randomly distributed within said specific area of said vibrational surface to drop onto said substrate.

2. The method according to claim 1, wherein said charge is provided from an overhead charge distributor.

3. The method according to claim 1, wherein said vibrational surface comprises a flexible and foldable foil or web.

4. The method according to claim 1, further comprising the step of arranging said substrate in said position below and in registration with said encircling guide.

5. The method according to claim 1, further comprising the step of positioning a further encircling guide circumferentially encircling said substrate while transferring said charge from said vibrational surface to said substrate and raising said further encircling guide for allowing said substrate to be removed after the transfer of said charge to said substrate.

6. Apparatus for applying and distributing a charge of a particulate edible material onto a top surface of a substrate made of an edible dough product, comprising:

delivery means for delivering said charge;

a movable vibrational surface having an area exceeding the area of said substrate, said surface being positioned above and in registration with said substrate, and being further positioned below said delivery means for receiving said charge from said delivery means;

an encircling guide configured and positioned for keeping said charge on said vibrational surface within a specific area corresponding to the area of said substrate, said encircling guide defining said specific area and having a lower end with a flexible skirt for contacting and sealing against said vibrational surface;

vibration generating means for vibrating said vibrational surface for causing said charge received on said vibrational surface and kept within said specific area defined by said encircling guide to be evenly and randomly distributed within said specific area; and motion generating means for moving said vibrational surface away from said position above and in registration with said substrate while vibrating said vibrational surface for allowing said charge evenly and randomly distributed within said specific area of said vibrational surface to drop onto said substrate thereby transferring said charge from said vibrational surface onto said substrate.

7. The apparatus according to claim 6, wherein said charge delivery means comprises an overhead charge distributor, positioned above and in registration with said encircling guide means.

8. The apparatus according to claim 6, wherein said vibrational surface comprises a flexible and foldable foil or web.

9. The apparatus according to claim 6 further comprising a substrate transportation means for arranging said substrate in said position below and in registration with said encircling guide means and for removing said substrate from said position after the transfer of said charge from said vibrational surface onto said substrate.

10. The apparatus according to claim 6 further comprising a second encircling guide having a position encircling said substrate while transferring said charge from said vibrational surface onto said substrate, said second encircling guide being raisable from said position for allowing said substrate to be arranged in a position below and in registration with second said encircling guide and to be removed from said position after the transfer of said charge from said vibrational surface onto said substrate.

11. The apparatus according to claim 6, wherein said vibration generating means vibrates said vibrational surface at a frequency of 1–25 Hz.

* * * * *